United States Patent [19]

Denman et al.

[11] Patent Number: 4,884,785
[45] Date of Patent: Dec. 5, 1989

[54] APPARATUS FOR SECURING A SPARE TIRE ON A VEHICLE

[75] Inventors: Stephen A. Denman, Centerville; Garthwood R. Taylor, Dayton, both of Ohio

[73] Assignee: Deuer Manufacturing Inc., Dayton, Ohio

[21] Appl. No.: 237,189

[22] Filed: Aug. 26, 1988

[51] Int. Cl.⁴ .............................................. B66D 1/00
[52] U.S. Cl. .................................... 254/389; 254/323; 224/42.23
[58] Field of Search ......................... 224/42.23, 42.21; 254/269, 270, 323, 389; 187/73

[56] References Cited

U.S. PATENT DOCUMENTS

| | | | |
|---|---|---|---|
| 434,637 | 8/1890 | Lamkin | 187/73 |
| 1,631,340 | 6/1927 | Rohlfing | 187/73 |
| 2,661,130 | 12/1953 | Evans | 254/323 |
| 4,535,973 | 8/1985 | Dorr et al. | 254/328 |
| 4,544,136 | 10/1985 | Denman et al. | 254/323 |
| 4,625,947 | 12/1986 | Denman et al. | 254/323 |

FOREIGN PATENT DOCUMENTS 47259  3/1982  Japan .................................. 224/42.23

Primary Examiner—John Petrakes
Assistant Examiner—Katherine Matecki
Attorney, Agent, or Firm—Jacox & Meckstroth

[57] ABSTRACT

A tire lift/carrier unit is mounted on a vehicle body and has a depending cable connected by a latch device to a fitting which supports the hub of a spare tire and wheel assembly. When the tire assembly is elevated by the unit to a stored position, the latch device is received within a holder also secured to the vehicle body. In event the cable fails to hold the spare tire assembly in the stored position, latch bolts spring outwardly from the latch device and engage the holder to prevent dropping of the tire assembly. The holder may be formed of adjustable or telescopic sections which may be tubular for enclosing the latch device.

17 Claims, 2 Drawing Sheets

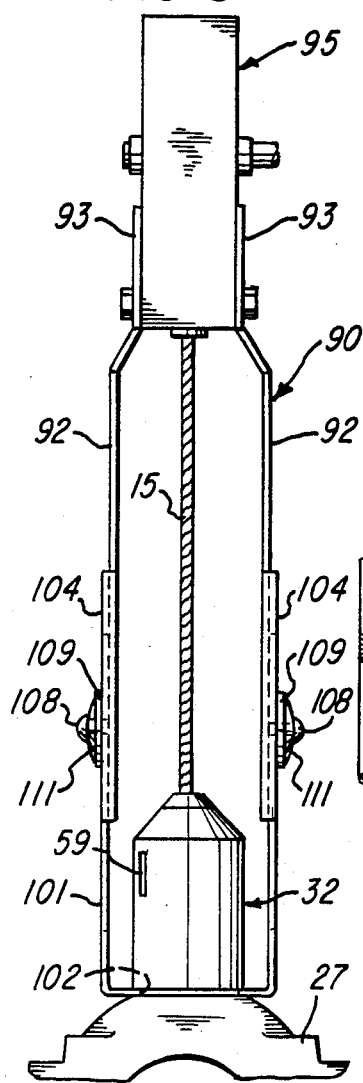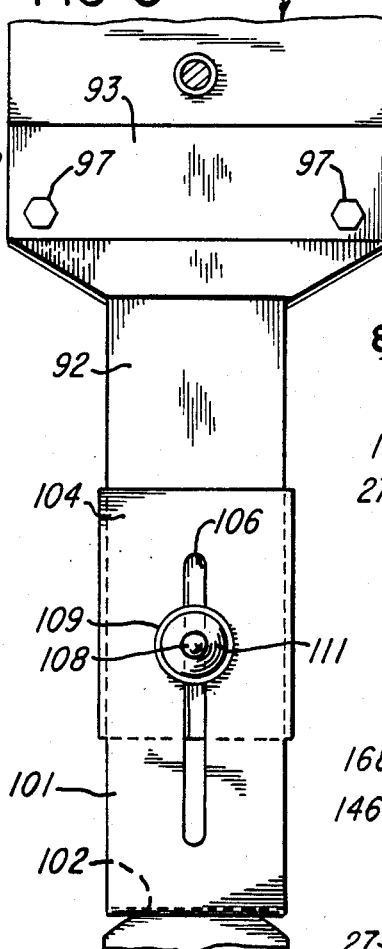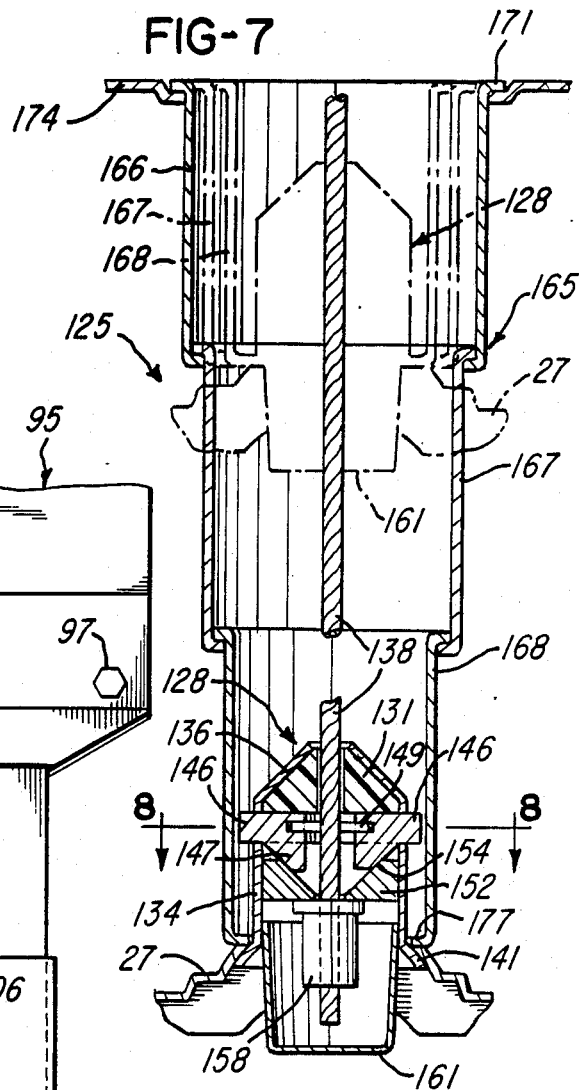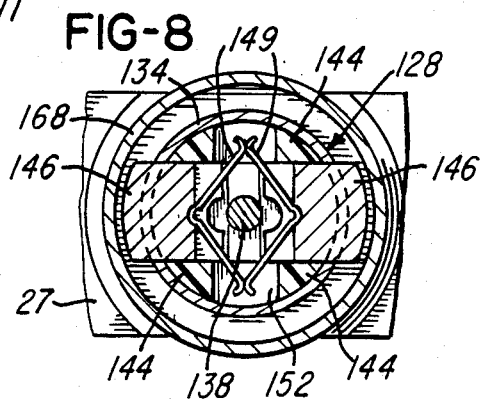

APPARATUS FOR SECURING A SPARE TIRE ON A VEHICLE

BACKGROUND OF THE INVENTION

In the use of tie lift/carrier units, for example, of the type disclosed in U.S. Pat. Nos. 4,544,136 and 4,625,947 which issued to the assignee of the present invention, a spare tire and wheel assembly is elevated to a stored position under a vehicle body by means of a cable which depends from a reel forming part of the unit. The cable is retracted on the reel and the spare tire assembly is elevated by rotating the reel with a drive and clutch mechanism as disclosed in the above patents. The cable holds the spare tire and wheel assembly firmly against the bottom of the vehicle body and prevents the tire assembly from bouncing against the vehicle body.

In the event the cable becomes damaged, for example, by a kink in the cable or by improper flexing, it is possible for the cable to become weak in the damaged zone and to break after an extended period of time while the tire assembly is in its stored position. In the event the cable breaks while the tire assembly is in its retracted stored position and the vehicle is moving along a road, the tire assembly would be free to drop downwardly to the road surface. While it is possible to put support straps or bars under the spare tire and wheel assembly after it is retracted to its stored position, such straps or bars would defeat the primary purpose of using the tire lift/carrier unit, that is, to provide for conveniently moving the spare tire assembly between an elevated stored position and a lowered release position where it is conveniently accessible for use in replacing a flat tire on the vehicle.

SUMMARY OF THE INVENTION

The present invention is directed to a novel device or apparatus which is ideally suited for use with a tire lift/carrier unit such as disclosed in the above-mentioned patents and which automatically connects or couples a stored spare tire and wheel assembly to a vehicle body in the event the cable fails to support the tire assembly in its stored position. Under normal use of the tire lift/carrier unit for raising and lowering the spare tire and wheel assembly, the apparatus of the present invention does not function to form a parallel or auxiliary connection of the tire assembly to the vehicle body. However, if for some reason the support cable breaks or becomes disconnected so that it fails to support the tire assembly, the apparatus of the present invention actuates and continues to support the spare tire assembly in an elevated position.

In accordance with one embodiment of the invention, the above features and advantages are generally provided by a latch unit or mechanism which connects the support cable to the fitting adapted to engage the hub portion of the wheel for the spare tire. The latch unit incorporates a set of retractable latch bolts or elements which are normally held in retracted positions by a cam member actuated by the support cable. When a spare tire assembly is elevated to its stored position, the latch unit enters a bracket or holder secured to the vehicle body along with the tire lift/carrier unit. In the event the cable breaks or otherwise fails to support the tire assembly in its stored position, the latch bolts spring outwardly to engage the bracket or holder and thereby connect the support fitting directly to the holder. The support bracket or holder may be vertically adjustable and may consist of telescopic tubular sections to accommodate different spare tire assemblies and also to provide sufficient time for actuation of the latch bolts after the cable breaks.

Other features and advantages of the invention will be apparent from the following description, the accompanying drawings and the appended claims.

BRIEF DESCRIPTION OF THE DRAWINGS

FIG. 5 is an elevational view of apparatus constructed in accordance with a modification of the invention;

FIG. 6 is a fragmentary side view of the apparatus shown in FIG. 5;

FIG. 7 is a vertical section similar to FIG. 2 and showing another embodiment of the invention; and FIG. 8 is an enlarged section taken generally on the line 8—8 of FIG. 7.

DESCRIPTION OF THE PREFERRED EMBODIMENTS

Figure 1:
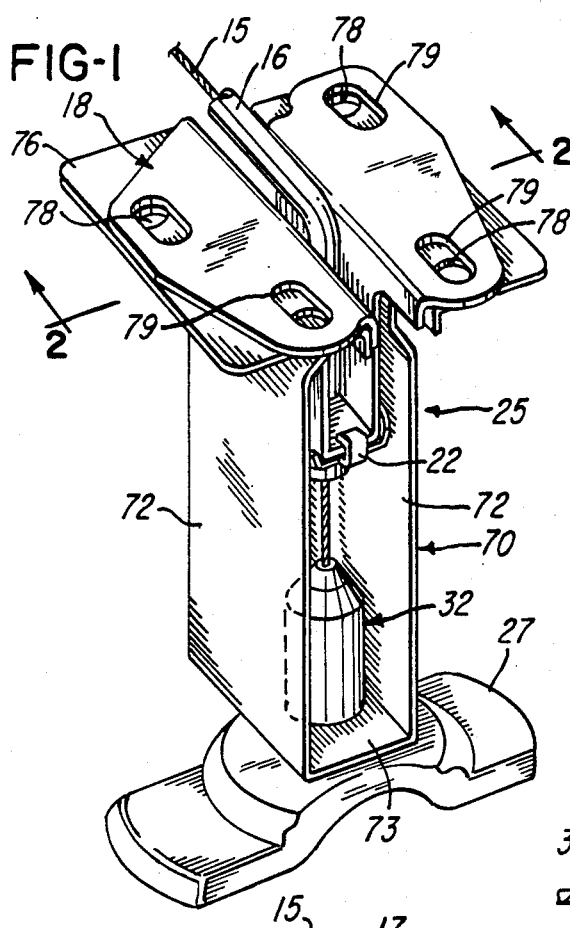
FIG. 1 is a perspective view of securing apparatus constructed in accordance with the invention.

Referring to FIG. 1, the apparatus of the present invention is particularly suited for use with a tire lift/carrier unit of the type disclosed in U.S. Pat. Nos. 4,544,136 and 4,625,947, the disclosures of which are incorporated by reference. As also shown in the embodiment described in connection with FIG. 13 of U.S. Pat. No. 4,625,947, a tire lift/carrier unit includes a cable 15 (FIG. 1) which is directed through a guide tube 16 having a downwardly curved outer end portion 17. The end portion 17 is also secured to a motor vehicle body by a bracket 18 having an inverted hat-shaped cross-sectional configuration. A cable guide bushing 21 is secured to the bracket 18 by a clamping collar 22, as described U.S. in Pat. No. 4,625,947.

In accordance with the present invention, a securing device 25 protects the connection of the cable 15 to a hat-shaped adaptor fitting 27 which engages a hub portion 28 of a metal wheel 30. The wheel 30 forms part of a spare tire and wheel assembly as provided with a motor vehicle such as a pickup truck or van. The device 25 includes a generally cylindrical latch unit 32 having a latch body 34 of molded plastics material or metal and surrounded by a tubular metal casing or shell 36 having a bottom flange 38 projecting outwardly under an annular flange 39 of the adaptor fitting 27.

The latch body 34 has a tapered or generally conical upper end portion 42 which is partially surrounded by a mating end portion 43 of the metal shell 36. The cable 15 extends downwardly through a center hole 46 within the latch body 34 and receives a tubular sleeve or collar 48 which is positively secured to the lower end portion of the cable 15. The collar 48 is confined within a counterbore 52 of the latch body 34, and an annular grove 54 within the latch body 34 receives an inwardly crimped or staked portion of the casing or shell 36 to secure the body 34 within the shell.

Figure 2:
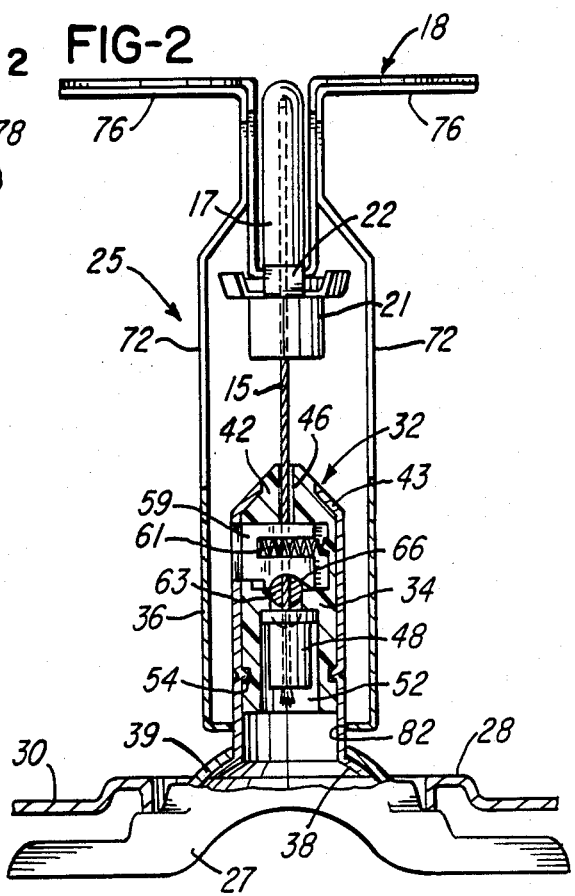
FIG. 2 is a section taken generally on the line 2—2 of FIG. 1 and showing the apparatus in its normal position when the spare tire and wheel assembly is stored.
Figure 3:
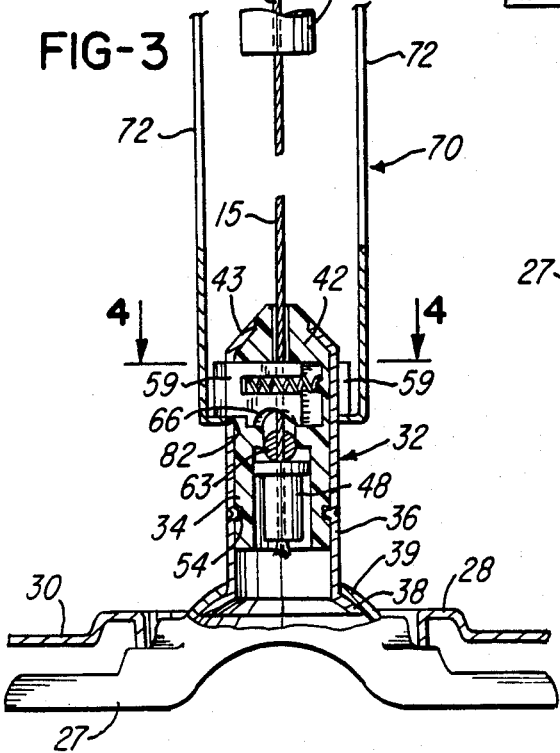
FIG. 3 is a fragmentary section similar to FIG. 2 and showing the apparatus in a latched position after the support cable has broken.
Figure 4:
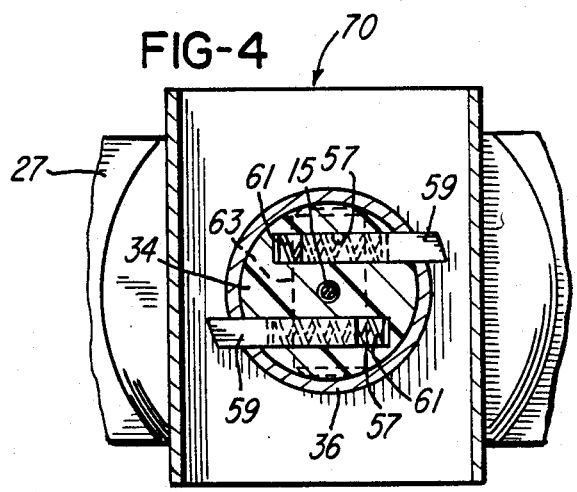
FIG. 4 is an enlarged section taken generally on the line 4—4 of FIG. 3.

Referring to FIGS. 2-4, a pair of parallel spaced slots 57 are formed within the latch body 34 and align with corresponding slots within the shell 36. A pair of latch elements or bolts 59 are slidably supported within the slots 57 and are urged outwardly by corresponding compression springs 61 captured within slots within the latch bolts. A cross pin 63 is mounted on the cable 15 directly above the collar 48 and is supported for vertical movement within the latch body 34 along with the collar 48. The cross pin 63 normally engages sloping cam surfaces 66 formed on the bottom of the latch bolts 59 and urges the latch bolts to their retracted positions (FIG. 2) compressing the springs 61.

An inverted hat-shaped holder or bracket 70 includes parallel spaced vertical side walls 72 which are connected by a bottom wall 73 and have outwardly projecting corresponding flanges 76 disposed under the flanges of the bracket 18. The flanges 76 have holes 78 which align with slots 79 within the bracket 18 for receiving machine screws or bolts for securing the brackets 18 and 70 to the body of the motor vehicle. The bottom wall 73 of the bracket 70 has a circular opening or hole 82 (FIG. 3) which is slightly larger in the diameter of the metal shell 36 so that the hole 82 receives the unit 32 when the spare tire and wheel assembly is elevated to its stored position (FIG. 2) by retraction of the cable 15 onto the reel of the tire lift/carrier unit.

As apparent from FIGS. 2-4, if the cable 15 should break or pull through the collar 48, the spare tire and wheel assembly would begin to drop from its stored position (FIG. 2). However, when the tension in the cable 15 is released, latch bolts 59 fire or spring outwardly in response to the forces exerted by the springs 61, and the latch bolts 59 engage the bottom wall 73 of the bracket 70, as shown in FIG. 3. The spare tire and wheel assembly is thus retained in this elevated lock position until the cable 15 is replaced or the latch bolts 59 are manually depressed into the body 34 so that the tire and wheel assembly may be removed from the support bracket 70.

Referring to FIGS. 5 and 6, a modified holder or support bracket 90 is constructed similarly to the support bracket 70, but is adjustable. The bracket 90 includes spaced sheet metal plates 92 having enlarged upper end portions with 93 which are secured to the side walls of a tire lift/carrier unit 95 by a pair of bolts 97. The lower portions of the plates 92 receive a U-shaped sheet metal bracket 101 which has a circular bottom opening 102 for receiving the latch unit 32. The side walls of the bracket 101 have channel-shaped upper end portions 104 which slidably receive the side plates 92 and have vertical slots 106. A pair of rivets 108 project outwardly through holes within the side plates 92 and through the slots 106 to receive corresponding friction washers 109 and cup-shaped spring washers 111. This friction connection of the plates 92 and 104 provides for telescopic or sliding movement of the bracket 101 on the side plates 92. As a result, the bottom wall of the support bracket 90 always seats on the top surface of the fitting 27 when the spare tire and wheel assembly is elevated to its stored position and regardless of the specific profile of the tire and wheel assembly.

A modification of apparatus constructed in accordance with the invention is illustrated in FIGS. 7 and 8. In this embodiment, a securing device 125 includes a latch unit 128 having a construction similar to that of the latch unit 32 described above and including a body 131 of molded plastics material or metal and surrounded by a metal casing or shell 134. The shell 134 has a tapered or frusto-conical upper end portion 136 which mates with the body 131 and defines a center opening or hole for receiving a cable 138 depending from the tire lift/carrier unit. The shell 134 has a lower end portion 141 which flares outwardly to support the fitting 27 for supporting the hub portion 28 of the spare tire and wheel assembly.

The latch body 131 has four downwardly projecting portions 144 (FIG. 8) which define a slot for receiving a pair of opposing latch bolts 146 having tapered bottom portions 147 (FIG. 7). A pair of opposing V-shaped flat wire springs 149 are confined within opposing slots within the latch bolts 146 and normally urge or bias the latch bolts 146 radially outwardly through corresponding slots within the shell 134 to extend positions as shown in FIGS. 7 and 8. A cylindrical cam member 152 surrounds the cable 138 and has a pair of opposing flat cam surfaces 154 which mate with corresponding surfaces on the bottom portions 147 of the latch bolts 146. A cylindrical collar 158 is positively secured to the cable 138 and normally engages the bottom surface of the cam member 152. A cup-shaped cover 161 projects into the bottom of the shell 134 to enclose the body 131, bolts 146 and collar 158 and is secured to the shell 134 by suitable means.

A holder or support member 165 is formed by three interfitting and telescopic tubular sections 166, 167 and 168, and the section 166 has an outwardly projecting top flange 171 which is supported by an annular plate 174 adapted to be secured to the bottom surface of the vehicle body. The bottom section 168 has an inwardly projecting flange 177 which defines a circular opening or hole for receiving the latch unit 128, and overlapping flanges 178 and 179 on the sections form a series connection of the sections.

When the spare tire and wheel assembly is being elevated to its stored position by retracting the cable 138 into the tire lift/carrier unit, the latch bolts 146 are forced inwardly to their retracted positions against the bias of the springs 149. This inward movement is caused by the cam member 152 which shifts upwardly within the shell 134 as a result of the tension within the cable 138 due to the weight of the tire and wheel assembly.

After the latch unit 128 enters the hole within the bottom flange 177, the fitting 27 engages the bottom flange 177. Continued retraction of the cable 138 until the tire engages the underneath surface of the vehicle body, causes the support section 168 to telescope within the section 167 and, if necessary, both of these sections to telescope within the section 166. When the spare tire engages the vehicle body surface, the latch unit 128 will stop somewhere between the full line and the dotted line positions shown in FIG. 7.

In the event the cable 138 would break because of being weakened or damaged through use, the tension is released within the cable 138, and the latch bolts 146 spring outwardly to the positions shown in FIGS. 7 and 8 so that the latch bolts will engage the bottom flange 177 of the support section 168. The spare tire and wheel assembly will then be supported in a released position slightly below its positive stored position.

From the drawings and the above description, it is apparent that a securing device or apparatus constructed in accordance with the present invention, provides desirable features and advantages. For example, as long as the cable 15 or 138 extending from the tire lift-/carrier unit is supporting the spare tire and wheel assembly in its uppermost stored position, the tire lift/carrier unit may be used for conveniently lowering the assembly to the ground so that it may be easily released from the fitting 27 and used to replace a flat tire. However, if the cable should break or fail to support the tire assembly in its stored position, the latch unit 32 or 128 becomes effective to engage the holder 70 or 90 or 165 as the tire assembly begins to drop. The adjustable holder or support member 90 or 165 further provides for accommodating spare tire and wheel assemblies having different heights between the hub 28 of the wheel 30 and the uppermost surface of the tire. In addition, the tubular support member 165 also forms and enclosure for the latch unit 128 and protects it from road dirt and other undesirable foreign material.

While the forms of securing apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. Apparatus for securing a spare tire and wheel assembly in an elevated stored position and adapted to be used under a vehicle body, said apparatus comprising a tire lift/carrier unit including a depending flexible cable, first support means connecting said cable to said assembly, said cable being extendable and retractable in response to actuation of said tire lift/carrier unit for moving said first support means and said assembly between said elevated stored position and a lower ground engaging position, second support means independent of said cable for supporting said first support means and said assembly in an elevated position spaced above the ground, one of said support means including a connecting member movable between a released position and an engaged position connecting said first support means to said second support means, and means for moving said connecting member to said engaged position in response to failure of said cable to support said assembly in said stored position.

2. Apparatus as defined in claim 1 wherein said first support means comprise a latch unit defining an opening for receiving the said cable, said second support means including a support member adapted to be connected to the vehicle body and defining an opening for receiving said latch unit, and said latch unit including at least one spring biased latch element forming said connecting member.

3. Apparatus as defined in claim 2 wherein said support member comprises a sheet metal member, and said latch unit includes at least two of said latch elements for engaging said sheet metal member.

4. Apparatus as defined in claim 2 wherein said latch unit includes a generally cylindrical latch body, a plurality of said latch elements supported for corresponding generally radial movement between a retracted position and an outwardly extended position, spring means for urging said latch elements to said extended positions, and cam means for holding said latch elements in said retracted positions when said tire and wheel assembly are supported by said cable.

5. Apparatus as defined in claim 2 wherein said support member is tubular and defines said opening for receiving said latch unit.

6. Apparatus as defined in claim 5 wherein said support member comprises a set of interfitting telescopic tubular sections for accommodating different tire and wheel assemblies in said stored position.

7. Apparatus as defined in claim 1 wherein said second support means comprise vertically adjustable means to accommodate different said tire and wheel assemblies in said stored position.

8. Apparatus as defined in claim 1 wherein said second support means comprises a set of support elements, and means connecting said elements for relative movement.

9. Apparatus as defined in claim 8 wherein said support elements comprise interfitting tubular sections.

10. Apparatus for securing a spare tire and wheel assembly in an elevated stored position and adapted to be used under a vehicle body, said apparatus comprising a tire lift/carrier unit including a depending flexible element, first support means connecting said element to said assembly, said element being extendable and retractable in response to actuation of said tire lift/carrier unit for moving said first support means and said assembly between said elevated stored position and a lower ground engaging position, second support means independent of said element for supporting said first support means and said assembly in an elevated position spaced above the ground, said second support means including a holder adapted to be connected to the vehicle body, said first support means including latch means movable between a released position and an engaged position connecting said first support means to said holder, and means for moving said latch means to said engaged position in response to failure of said element to support said assembly in said stored position.

11. Apparatus as defined in claim 10 wherein said latch means comprises a latch body receiving said flexible element, at least one latch element supported by said latch body for movement between a retracted position and an extended position, and means for moving said latch element from said retracted position to said extended position in response to said failure of said flexible element.

12. Apparatus as defined in claim 10 wherein said latch means include a latch body supporting at least one latch element for generally horizontal movement, and spring biased means for moving said latch element to an outwardly projecting position for engaging said holder in response to failure of said element.

13. Apparatus as defined in claim 12 wherein said holder comprises a sheet metal member, and said latch means include at least two of said latch elements supported by said body for said horizontal movement.

14. Apparatus as defined in claim 12 wherein said latch body is generally cylindrical, a plurality of said latch elements supported for corresponding generally radial movement between a retracted position within said body and an outwardly extended position, spring means for urging said latch elements to said extended positions, and cam means for holding said latch elements in said retracted positions when said tire and wheel assembly are supported by said element.

15. Apparatus as defined in claim 10 wherein said holder has a bottom opening for receiving said latch means.

16. Apparatus as defined in claim 15 wherein said holder comprises adjustable means for accommodating different tire and wheel assemblies in said stored position.

17. Apparatus for securing a spare tire and wheel assembly in an elevated stored position and adapted to be used under a vehicle body, said apparatus comprising a tire lift/carrier unit including a depending flexible cable, first support means connecting said cable to said assembly, said cable being extendable and retractable in response to actuation of said tire lift/carrier unit for moving said first support means and said assembly between said elevated stored position and a lower ground engaging position, second support means independent of said cable for supporting said first support means and said assembly in an elevated position spaced above the ground, said second support means including a sheet metal holder adapted to be connected to the vehicle body, said first support means including a latch member movable between a released position and an engaged position connecting said first support means to said holder, means for moving said latch member to said engaged position in response to failure of said cable to support said assembly in said stored position, and said holder including adjustable means for accommodating different said tire and wheel assemblies in said stored positions.

* * * * *